July 20, 1965  J. M. DLOTT  3,195,400
OPTICAL PROJECTOR PRODUCING SUPERIMPOSED IMAGES FROM
REVOLVING CONCENTRIC FILM TRACKS
Filed July 5, 1962  3 Sheets-Sheet 1
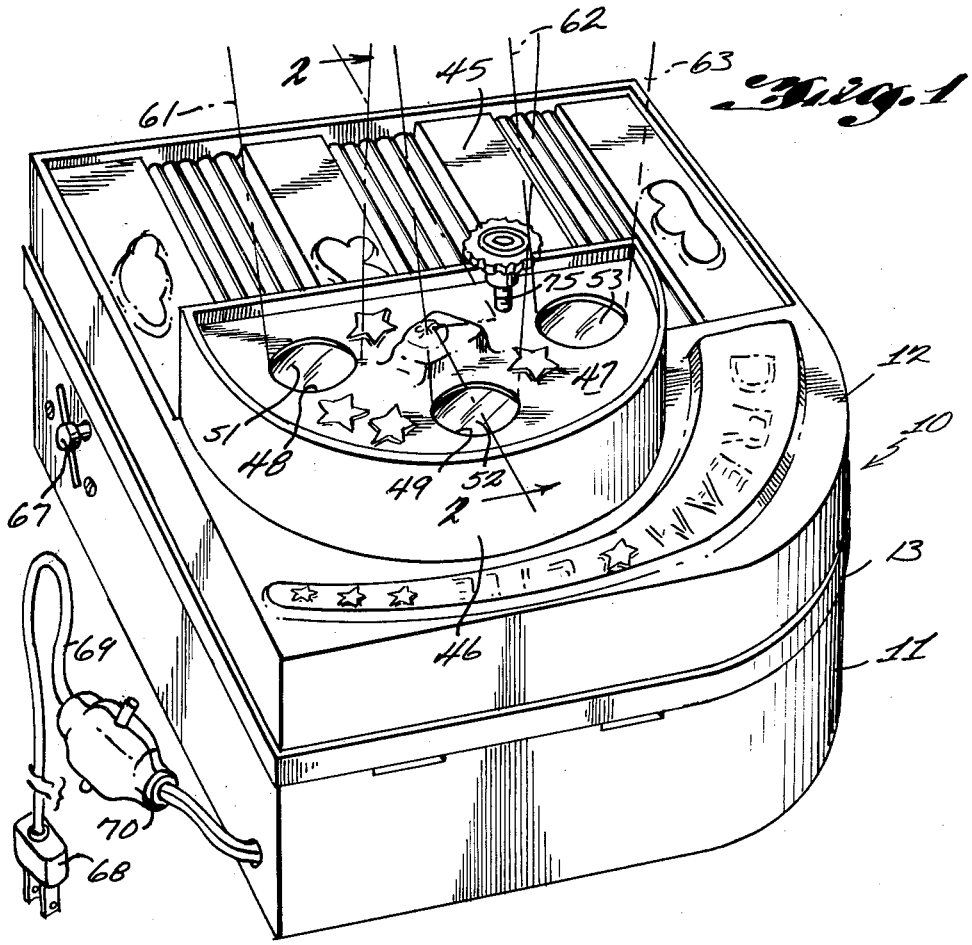
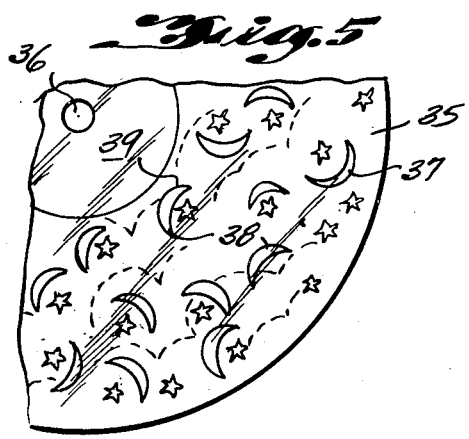
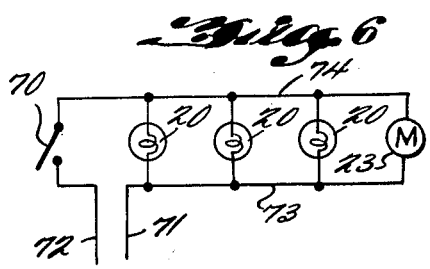
INVENTOR
JOSEPH M. DLOTT
BY
Kimmel & Crowell
ATTORNEYS July 20, 1965  J. M. DLOTT  3,195,400
OPTICAL PROJECTOR PRODUCING SUPERIMPOSED IMAGES FROM
REVOLVING CONCENTRIC FILM TRACKS
Filed July 5, 1962  3 Sheets-Sheet 2
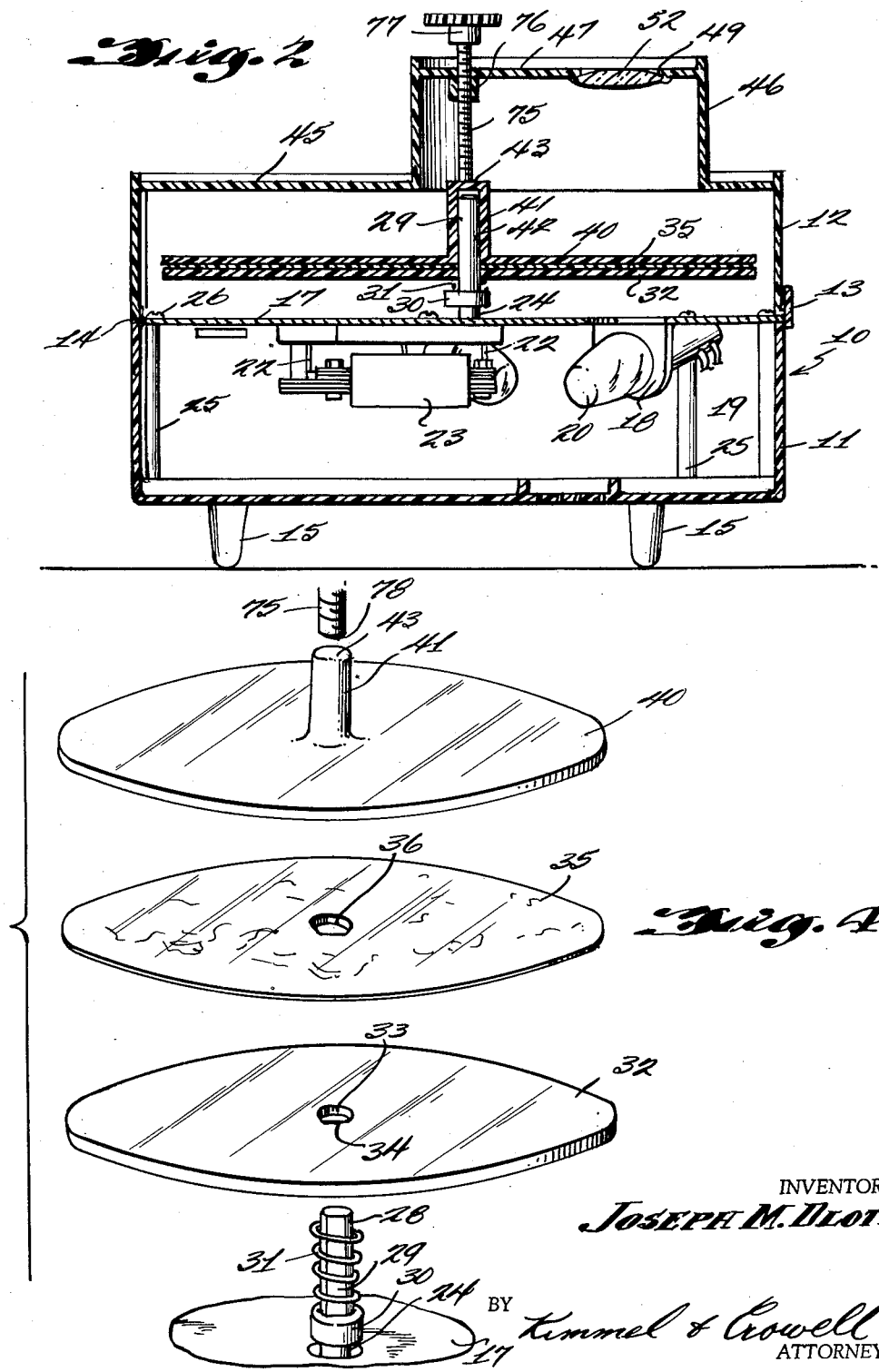
INVENTOR
JOSEPH M. DLOTT
BY
Kimmel & Crowell
ATTORNEYS July 20, 1965  J. M. DLOTT  3,195,400
OPTICAL PROJECTOR PRODUCING SUPERIMPOSED IMAGES FROM
REVOLVING CONCENTRIC FILM TRACKS
Filed July 5, 1962  3 Sheets-Sheet 3
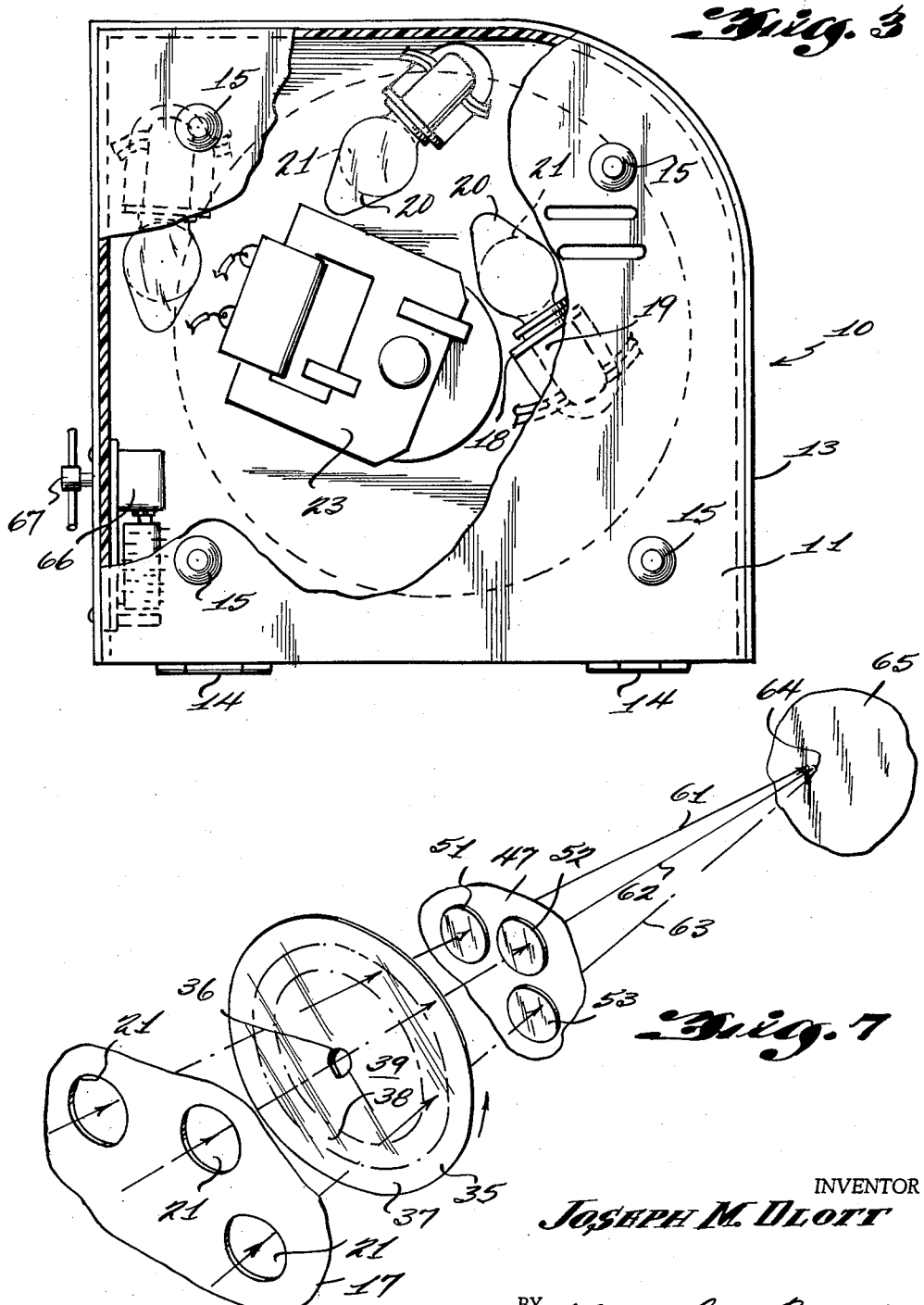
INVENTOR
JOSEPH M. DLOTT
BY Kimmel & Crowell
ATTORNEYS

United States Patent Office 3,195,400
Patented July 20, 1965

3,195,400
OPTICAL PROJECTOR PRODUCING SUPERIMPOSED IMAGES FROM REVOLVING CONCENTRIC FILM TRACKS
Joseph M. Dlott, Indianapolis, Ind., assignor to Dream Lite Co., Dayton, Ohio, a corporation of Ohio
Filed July 5, 1962, Ser. No. 207,695
1 Claim. (Cl. 88—24)

This invention relates to an optical projector for creating a three-dimensional optical effect of images in motion.

More particularly the invention relates to an arrangement of optical systems which creates a three-dimensional optical effect of images in motion and moving at relatively different speeds.

A more specific object of the invention is the provision of a device having a plurality of optical projection systems so arranged as to project images on an exterior screen or surface from a plurality of concentrically arranged film tracks or transparencies. The optical axes of the respective optical systems converge to an orthocentric point in a common focal plane, the images thus being projected on the screen or surface in superimposed relation. Because the film tracks are concentrically arranged they travel at different circular speeds, and the images thus pass across the screen or surface at relatively different speeds and in different orbits creating a three-dimensional optical effect of images in motion.

Still another specific object of the invention is the provision of a device of this character which is particularly designed for the entertainment of a child, and wherein the images are projected on the ceiling above the bed or crib of the child, and will assist in lulling the child to sleep.

A further specific object of the invention is the creation of such a system wherein means are provided for varying the effective focal length of the device to insure a sharp focus on the ceiling, or vertically positioned screen or surface if desired, in accordance with the distance of the projector therefrom.

A further specific object of the invention is the provision of a device of this character having a music box or the like associated therewith, whereby sound effects may be produced during the operation of the device.

An additional object of the invention is the provision of such a device which is sturdy and durable in construction, reliable and efficient in operation, and relatively simple and inexpensive to manufacture.

Still other objects reside in the combinations of elements, arrangements of parts, and features of construction, all as will be more fully pointed out hereinafter and disclosed in the accompanying drawings wherein there is shown a preferred embodiment of this inventive concept.

In the drawings:

FIGURE 1 is a perspective view of one form of image projector embodying the instant inventive concept.

FIG. 2 is a sectional view taken substantially along the line 2—2 of FIG. 1 as viewed in the direction indicated by the arrows.

FIG. 3 is a bottom plan view of the structure, parts thereof being broken away to disclose the interior construction.

FIG. 4 is an exploded perspective view of certain of the elements showing the means for adjusting the focal length of the device.

FIG. 5 is a fragmentary view of one of the circular transparencies carrying images which are adapted to be projected.

FIG. 6 is a schematic wiring diagram of the device, and

FIG. 7 is a perspective view disclosing the focusing and projection of an image on a surface to the optical system of the instant invention.

Similar reference characters refer to similar parts throughout the several views of the drawings.

Having reference now to the drawings in detail, there is generally indicated at 10 a casing or housing which includes a lower section 11 and an upper section 12, the lower section 11 being provided along its upper edge with a flange 13, which overlies the bottom of section 12, and sections 11 and 12 being connected together along aligned edges as by means of hinges 14, to provide ready access to the interior of the device.

Lower section 11 is supported on legs 15, and includes a top supporting plate or partition 17 which extends transversely thereacross.

Partition 17 is provided with a plurality of downwardly struck apertured tongues 18, in the illustrative embodiment of the invention herein shown, three, each of which supports a light socket 19 containing a bulb 20. Circular openings 21 are provided in partition 17 directly above each bulb 20 so that light emanating from the bulbs is projected upwardly through the openings.

Additional tongues 22 struck from plate 17 depend downwardly and support a conventional electric drive motor 23, having a drive shaft 24 which extends through a central opening in plate 17.

Plate 17 is supported on uprights 25, integral with lower case section 11, and having threaded bores in the tops thereof for the reception of screws 26 retaining plate or partition 17 in position.

Drive shaft 24 has fixedly mounted thereon a spindle 28 having a flat side 29 and a flange 30, spindle 28 being surrounded by a compression spring 31, one end of which seats against the flange or annulus 30.

A transparent lower disc 32 is provided with a central aperture 33 having a flat side 34, and is positioned on spindle 28, the cooperating flat sides 29 and 34 serving to drive the transparent disc 32. A suitable film or transparency 35 having a central aperture 36 is adapted to be removably positioned on spindle 28, the transparency carrying three adjacent rows of annularly positioned designs, illustrated at 37, 38 and 39. It is to be understood that the designs or ornamentation may be of any desired type, and that due to the previously mentioned concentric relation each row provides a film track which travels at different circular speeds.

A transparent top plate 40 has a central boss 41, with an internal bore adapted to seat over spindle 28, the bore being designated at 42, and the boss having a flat top surface 43, the purpose of which will be pointed out hereinafter.

Upper section 12 includes a flat ornamented top surface 45 having a semicircular raised housing 46 thereon, the housing having a top surface 47 which is provided with three openings 48, 49 and 50, each of which contains a lens 51, 52 and 53.

The arrangement of openings 48, 49 and 50 is such that they directly overlie one of the openings 21, each opening 21 being so positioned as to underlie a different film track 37, 38 and 39, so that three independent means of light are projected through the openings, the transparency or film 35, which is rotated by the motor 23 and its associated drive shaft 24, and thence through the lenses 51, 52 and 53, to provide focusing light means 61, 62 and 63 as best shown in FIG. 7, which achieve a common focal point 64 on a ceiling 65, or a screen or wall as the case may be upon which the images carried by the transparency are projected in superposed three-dimensional relationship.

A conventional music box 66 of any desired conventional type is attached to the inner side of the wall of lower section 11, and is adapted to be mechanically wound by means of a key 67 projecting exteriorly of the casing.

Power is supplied to the mechanism through a plug 68 which is connected by means of a cord 69 to a switch 70, cord 69 containing the customary two wires 71 and 72 as best shown in FIG. 6. Switch 70 closes a circuit between wires 73 and 74, which are connected in parallel with each of the bulbs 20 and the motor 23, as best shown in FIG. 6, so that the bulbs and motor are energized simultaneously upon closure of switch 70. It is to be understood that the motor 23 revolves its associated drive shaft 24 at a very slow rate of speed, so that the images move rather slowly across the surface upon which they are projected.

Focusing of the device is effected by means of a screw 75 which extends through an opening in a threaded boss 76 in the top 47 of the housing 46, the outer extremity of the screw being provided with a knurled knob 77 for rotation thereof. The lower end 78 of screw 75 is aligned with and normally engages the top 43 of boss 41, the arrangement being such that rotation of the screw in one direction forces the transparent plates 40 and 32, and the interposed transparencies 35 downwardly against the bias of spring 31, while rotation of the screw 75 in the opposite direction permits the spring 31 to force the transparent discs and their interposed transparencies upwardly, thus varying effectively the focal length of the light beams emanating through openings 21 from bulbs 20, and the associated lenses 51 and 52 and 53.

It is to be understood that the individual designs 37, 38 and 39 are not projected in three dimension by the device of the instant invention, but rather the overall superimposed relationship of these designs and their relative movement with respect to each other gives a three-dimensional effect to the projected images taken as a whole.

From the foregoing it will now be seen that there is herein provided an improved optical projector, which is characterized by extreme simplicity, and relatively high entertainment value, and which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

A device for projecting images comprising a housing, a spindle within said housing, means rotating said spindle, a transparent turntable longitudinally slidable on said spindle and secured to said spindle for rotation therewith, a disc carried by said turntable, said disc having a plurality of transparencies arranged in at least three concentric annular tracks and about said spindle, a transparent top plate carried by said disc, a plurality of light sources carried by said housing on the side of said turntable opposed to said disc, one light source being disposed in alignment with each annular track, a plurality of lens means carried by said housing on the side of said top plate opposed to said disc, one lens means being aligned with each light source, the optical axes of said plurality of lens means converging to a common focal point remote from said housing, whereby images of said transparencies are superimposed at said common focal point, the images of transparencies in different annular tracks moving at different rates of speed, focal point varying means comprising spring means circumscribing said spindle beneath said turntable and normally biasing said turntable toward said disc, said top plate having a recessed central boss slidably carried on said spindle, and screw means carried by said housing and having an end portion in bearing engagement on said central boss against the biasing of said spring means, said end portion of said screw means being movable toward and away from said central boss to vary the relative position between said transparencies and their respective lens means.

References Cited by the Examiner

UNITED STATES PATENTS

| | | | |
|---|---|---|---|
| 1,651,467 | 12/27 | Nothstine | 272—10 X |
| 2,243,084 | 5/41 | Browne | 88—24 |
| 2,307,202 | 1/43 | Eddy | 88—24 |
| 2,701,981 | 2/55 | Rutt | 88—27 |

LEO SMILOW, *Primary Examiner.*

EMIL G. ANDERSON, *Examiner.*